3,184,799
CONTROL MECHANISM FOR FEED EQUIPMENT
OF RECTILINEAR COMBERS
Roger Gauvain, Buhl, Haut-Rhin, France, assignor to Société Alsacienne de Constructions Mecaniques, Mulhouse, Haut-Rhin, France, a company of France
Original application Sept. 3, 1959, Ser. No. 837,922, now Patent No. 3,074,119, dated Jan. 22, 1963. Divided and this application Aug. 28, 1962, Ser. No. 219,831
Claims priority, application France, Sept. 12, 1958,
4 Claims. (Cl. 19—225)

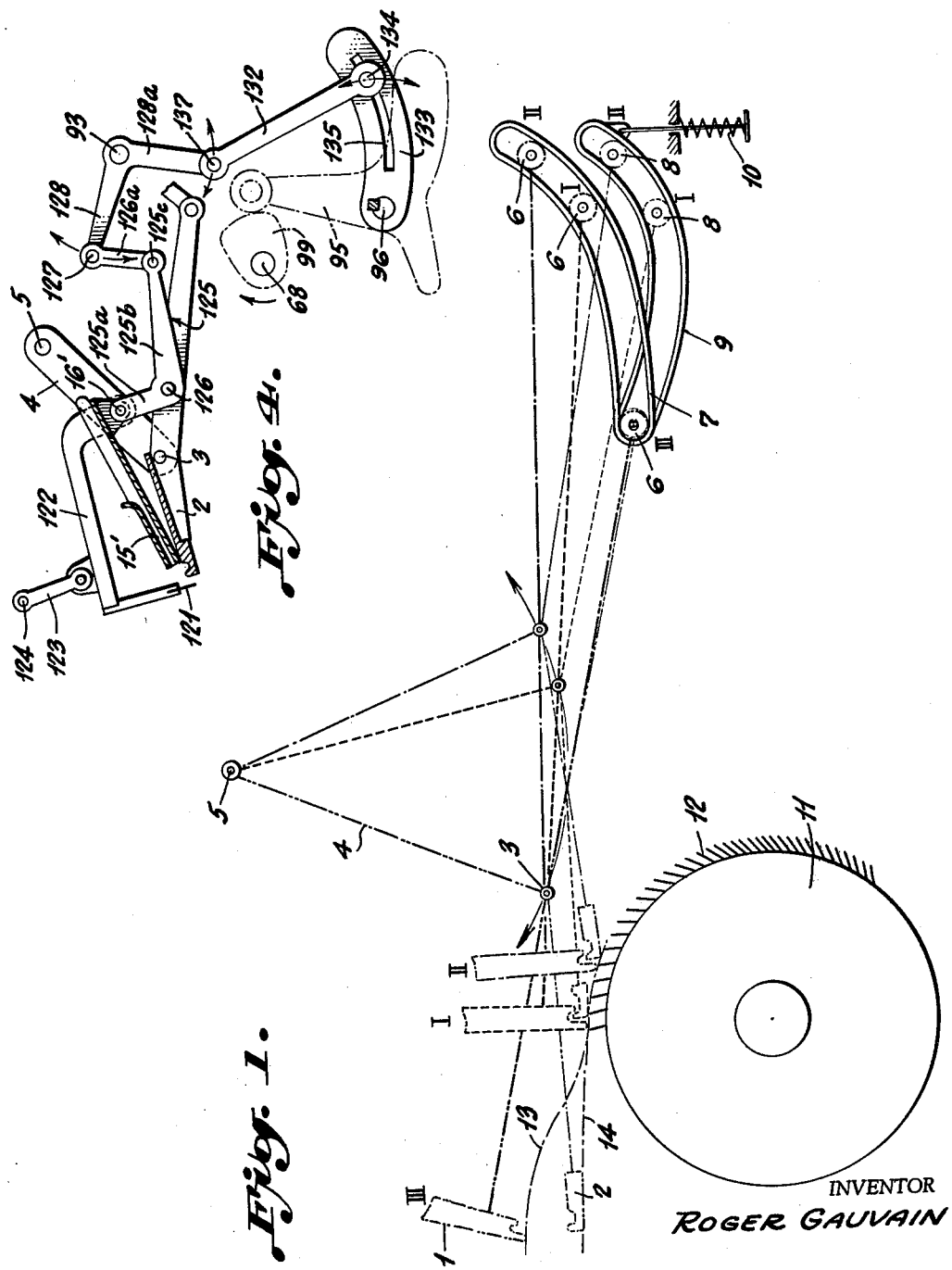

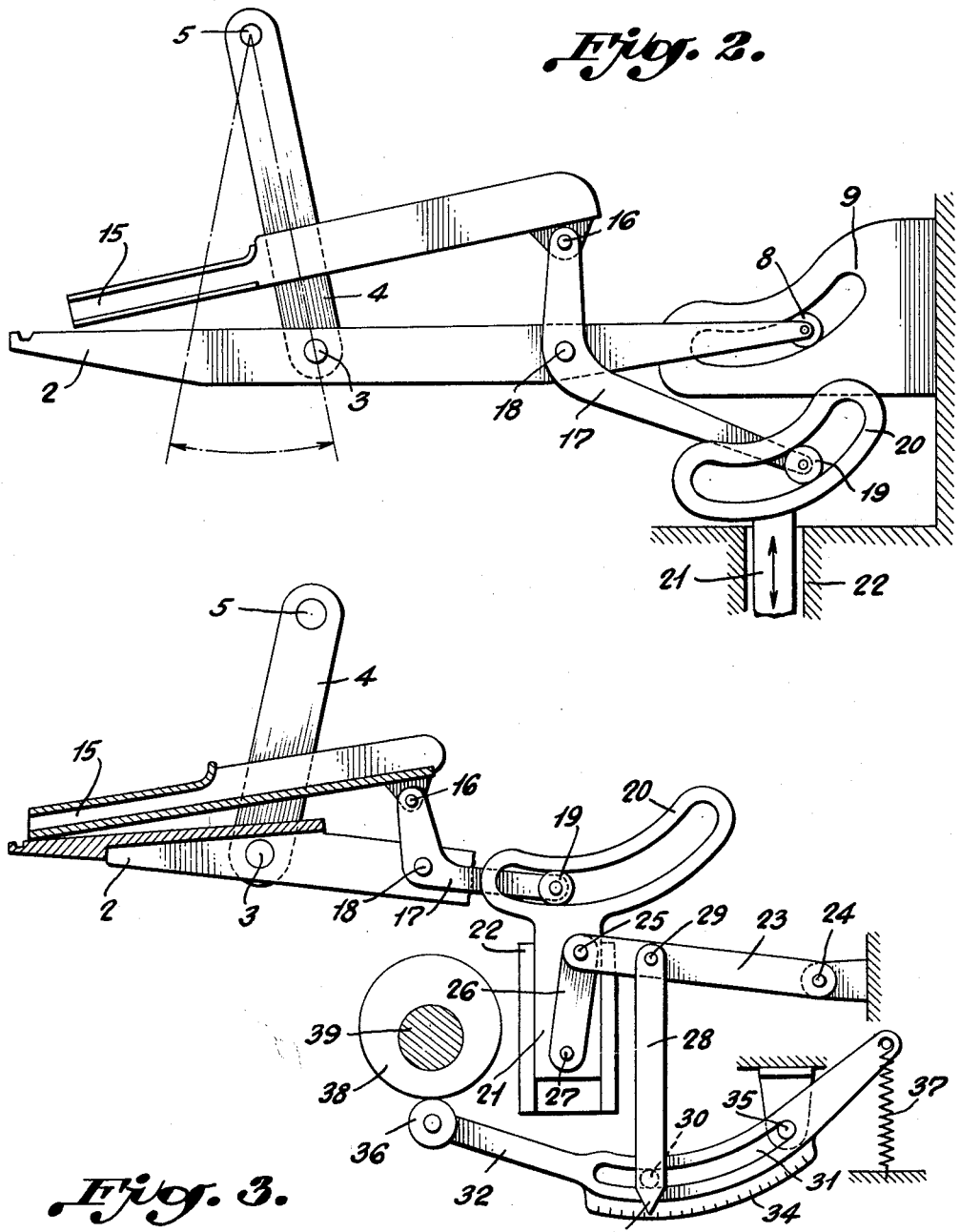

This application is a divisional application of my pending United States application Serial No. 837,922 filed September 3, 1959, now U.S. Patent No. 3,074,119 and relates to rectilinear combers.

It is an object of the invention to greatly simplify the feed equipment of rectilinear combers, more particularly with a view to reducing the number and complexity of moving parts, friction and the detrimental effects of inertia, the invention thus reducing costs and considerably increasing efficiency.

It is a further object of the invention to enable the amplitude of the feed movement to be controlled from outside the machine without any alteration in the end-of-travel position of the feed equipment, while the feed can be stopped completely by a simple zero-setting adjustment of said means without any interruption in the general operation of the machine, including the movement of the nippers.

The invention has for its subject matter a mechanism for controlling feed equipment of a rectilinear comber.

In a construction according to the invention, the feed equipment is constituted by a feed rack fitted directly for reciprocatory motion to the bottom nipper and is controlled by a lever articulated thereto, the free end of the latter lever being operated in an additional slideway identical and parallel with the slideway guiding and determining the path of the bottom nipper. It will be apparent that the required feed movement can be provided if relative reciprocation can be produced between the two slideways, preferably transversely to the general direction thereof.

This feature provides a number of advantages. The feed movement is determined in relation to the nippers themselves and not, as in conventional machinery, in dependence upon the general mechanism of the machine. The simple reciprocating movement hereinbefore described is always enough on its own to control the feed system, however complex the path followed by the nippers may be. Lack of registration, which was inevitable with the prior art independent mechanisms, is completely obviated. Finally, thet phase of the feed movement can be controlled and distributed in time by very simple means, for the same have merely to vary the law governing the reciprocation aforesaid. In this respect, according to a special feature of the invention, the control mechanism hereinbefore described is supplemented by a control device which is readily accessible from outside the machine and by which the amplitude of the said reciprocation can be varied over a predetermined range without altering the position in space of the end point of such movement, such amplitude possibly being reduced right down to zero.

By means of this control device the amount of fibres introduced into the machine at each combing cycle can be varied simply by moving a single manual control member, while the feed can, if required, be stopped without stopping the machine. A wide variety of inspections or adjustments can therefore be performed without the need to withdraw the fibres from the machine.

In a preferred embodiment, the aforesaid control device consists of a slider movable in a curved slot in one lever of a system comprising a rod interconnecting two levers, one of which is rocked by a cam driven by the general mechanism of the machine, while the other operates a linkage connected to a slide bearing the slideway guiding the control lever for the feed mechanism.

According to another feature of the invention, the curved slot takes the form of an arc of a circle which, when the slotted lever is in the position corresponding to the end of the feed travel, has its center coincident with the articulation of the rod to the other lever.

It will therefore be apparent that if the axis of the slider coincides with the axis of the slotted lever, the oscillation thereof will operate neither the rod nor, therefore, the other lever and the rest of the feed mechanism, with the result that the same is stopped at the end of its travel. On the other hand, the amplitude of the feed movement increases as the slider is moved away from said bearing axis, but the stroke limit position of the transversely reciprocable slideway corresponding to the end-of-travel position of the feed rack does not vary because in this position the slider can pass through the whole slot without causing displacement of the other lever.

It should be pointed out that the mechanism for controlling the nippers and the feed equipment according to the invention can be used in any existing or even any future rectilinear comber due to the feature of the mechanism which is the paths and the timing of the function of the nippers (including its cyclic opening movement) and of the feed equipment can be determined as required by suitably designing the guiding means.

Other objects and advantages of the invention will be hereinafter described with reference to the accompanying drawings, given merely by way of example, and in which:

FIG. 1 is a very diagrammatic illustration of the nippers of a rectilinear comber according to the invention in various phases of their operation with rear guiding by means of slideways, FIG. 2 is a diagrammatic view showing how a feed rack is arranged on the bottom nipper, FIG. 3 is a simple device for controlling the feed rack illustrated in FIG. 2, and FIG. 4 is another form of actuating mechanism as may be employed to operate the feed rack.

Referring to FIG. 1, in the control mechanism according to the invention the top nipper 1 and bottom nipper 2 of a rectilinear comber are suspended by their articulation axis 3 on a rocking arm or suspension rod so that the weight of the nippers is substantially in equilibrium on said axis. In the embodiments illustrated, the nippers are suspended at the bottom end of a rocking arm diagrammatically represented at 4, and of which there can be seen at 5 the axis of suspension on the machine framework.

In the embodiment shown in FIG. 1, the rearward end of the top nipper is provided with a roller 6 guided in a curved slideway 7. Similarly, the rearward end of the bottom nipper is provided with a roller 8 guided in a slideway 9 which is also stationary during most of the nippers' travel but which rises slightly at the end of said travel to compress the spring 10 to press the nippers closed.

In FIG. 1, it will be seen that the rollers 6 and 8 appear to coincide in position III, but this appearance is purely fortuitous. The plane of the slideways 9 and 7 are separate from one another, and the front ends thereof are not necessarily in alignment with one another. To assist in the understanding of the operation of the control mechanism, the arm of the top nipper 1 is diagrammatically shown by a straight axis, while the arm of the bottom nipper is shown by a broken line. This particular representation does not limit the invention to any particular nippers design.

It will further be noted that the axis of the top nipper is illustrated in a heavier line than the axis of the lower nipper. The two axes are shown in dotted line for the formation denoted I, and in chain-dotted lines for the formation denoted II. For formation III chain-double dotted lines are used, and the same symbols have been employed to indicate the three corresponding positions of the axis of arm 4 and the profiles of the nose ends of the nippers. Some axes have been interrupted on either side of the articulation axis 3 for clarifying the drawing, and only the nose ends of the nippers are illustrated.

The combing cylinder 11, on which can be seen needles 12 increasing in number, is shown in the position corresponding to the beginning of the phase of combing of the head end of the tuft. The paths followed by the top nipper 1 and the bottom nipper 2 have the references 13, 14, respectively, and rearward ends of the paths coincide for closure of the nippers and, in the example illustrated, are concentric with the periphery of the combing cylinder.

The operation of the nippers and the combing cylinder has already been disclosed and described in copending application Serial No. 837,922, now Patent No. 3,074,119 referred to and identified above.

Referring to FIG. 2, the bottom nipper 2 is articulated at 3 to the bottom of a rocking arm 4 suspended on the machine frame at 5. The roller 8 guides the rear end of the nipper 2 in a slideway 9 which, to simplify the illustration of the feed equipment control mechanism, is assumed to be stationary although in practice the slideway could be of the spring kind described with reference to FIG. 1.

The feed rack 15 is articulated at 16 to one end of a bent lever 17 articulated at 18 to the rearward part of the bottom nipper 2. The free end of the bent lever 17 bears a roller 19 guided in a slideway 20 which is always parallel with the slideway 9 but is fitted to a slide member 21 guided in a stationary part 22 so that the slideways 20, 9 can be moved towards or away from one another while always being maintained parallel with one another.

It will be readily apparent that, with this arrangement, when the rocking arm 4 rocks the nipper 2, then, if the slide 21 remains stationary, the constant separation between the rollers 8, 19 maintains the feed rack 15 in the same position relatively to the nipper 2. On the other hand, whatever the position of the nipper 2 the separation between the rollers 19 and 8 can be reduced, and the feed rack 15 can therefore be moved towards the nose end of the nipper 2 by moving the slide 21 in the direction associated with movement of the slideway 20 towards the slideway 9.

It will be apparent that the feed rack 15 can be controlled by a simple translational movement of the slide 21, however complex the path of the nipper 2 may be, since the fact that the slideways 20, 9 are parallel with one another means that the relative position between the feed rack 15 and the nipper 2 is independent of the path thereof.

FIG. 3 illustrates a particular embodiment of the feed rack control mechanism which provides a control, possibly to the extent of complete cancellation, of the amplitude of the advancing movement of the feed rack 15 but without any change in the position thereof relatively to the nipper 2 at the end of the feeding movement. The parts of FIG. 3 are shown in this end-of-movement position. Only the slideway 20 is illustrated because, in the position shown in FIG. 3, the projections of the slideways 20, 9 coincide in the plane of the drawing. Elements corresponding to the elements shown in FIGS. 1 and 2 have like references and will not be described again.

The slide 21 is operated by a lever 23 pivoted to a stationary part of the frame on a pivot 24 and articulated at 25 to a link 26 which connects it at 27 to the slide 21. A rod 28 articulated to the lever 23 at 29 has at its free end a pin 30 slidable in an arcuate slot 31 in a second lever 32. The rod 28 also bears a pointer 33, the position of which is shown by a curved scale 34 of the lever 32. The same bears at 35 against a stationary part of the frame and bears a roller 36 maintained in continuous engagement by a spring 37 with a cam 38 driven by a shaft 39 connected to the general mechanism of the machine. The bearing pivot 35 of the lever 32 coincides with that end of the curved slot 31 which is farther from the roller 36. In the position illustrated, which corresponds to the end of the operative movement of the feed rack 15, the roller 36 is at the minimum distance from the spindle of the cam 38. With the device in the position illustrated, the pivot point 29 where the rod 28 is articulated to the lever 23 coincides with the center of curvature described by the curved slot 31.

If the pointer 33 is now moved to the zero mark on the scale, in which position the axis of the pin 30 coincides with the pivot 35 of the lever 32, the same, which is rocked by the cam 38 around the pivot 35, will therefore also be rocked around the axis of the pin 30 and will not displace the rod 28 nor the rest of the mechanism; the feed rack 15 will therefore remain stationary relatively to the nipper 2 at the end of the feeding movement.

In other words, rocking of the nipper 2 will not be associated with a feed movement. With this arrangement the machine can operate idly without any need to remove the fibres from it.

Also, it has been seen that when the cam is in the position shown, the spindle 29 is at the center of the curved slot 31. The pointer 33 can therefore move over the whole scale 34 without causing any offsetting of the feed rack 15 from its end-of-movement position. On the other hand, the farther the pointer 33 is moved from the zero position, the greater becomes the length of the lever arm 32 acting on the rod 28 and therefore the greater becomes the return amplitude of the feed rack 15 at each revolution of the cam.

Of course, the cam 38 can be variable or have a more complex profile providing, inter alia, a counter-feeding phase at each revolution of the cam, without for that reason departing from the scope of the invention.

In the embodiment shown in FIG. 4 the feed rack 15 is shown mounted to the modified mechanism in the same manner as the rack is mounted to the similar mechanism disclosed in FIGS. 1 through 3.

The mechanism is controlled by a control shaft 68 which is journaled on the machine frame and rotates uniformly.

The device illustrated in FIG. 4 includes a pendulum 123 which corresponds to the pendulum 4 of FIG. 3, with a top comb 121 mounted at the front end of a bar 122 carried near the said front end by said pendulum, which is articulated on a fixed pivot 124 by one arm 125a of a bell-crank lever 125. The bell crank 125 corresponds to the similar bell crank 17 of FIG. 3 and acts to operate the feed rack 15' pivotally mounted at the forward end 16' in the same manner as the feed rack 15 mounted to pivot 16, as illustrated in FIG. 3.

The other arm 125b of the said bell crank lever is articulated at 125c to a link 126a articulated at 127 on the free end of another bell crank lever 128, 128a having its apex freely rotatable around shaft 93. The arm 128a of this lever is linked at its free end through a connecting rod 132 to another lever 133 keyed on a shaft journaled in the machine frame and which, in the example show, is constituted by the shaft 96 controlling the feed rack.

The shaft 96 is actuated by a cam 99 keyed on shaft 68 through the lever 95, as shown in dot-dash lines in FIG. 4.

Whenever the control shaft 68 rotates by one turn, the cam 99 keyed on said shaft oscillates the lever 95 first in one direction and then in the other which causes, through the other parts of the above-described mechanism, a corresponding to and fro motion of the bar 122 carrying the comb 121 and operative movement of the feed rack 15' in a similar manner to the mechanism of FIG. 3.

While the invention has been described with reference to a preferred embodiment, it is not intended to limit the scope of the invention to the embodiment illustrated, nor otherwise than the terms of the subjoined claims.

What is claimed is:

1. A control device for a rectilinear comber having a combing cylinder, comprising a suspension rod having upper and lower ends, means pivotally securing the upper end of said rod to a fixed point above the axis of the cylinder, upper and lower nippers, each nipper having a nose end and a rear end, a feed rack slidably mounted on said lower nipper, said feed rack having forward and rearward end portions, said nippers and feed rack being mounted for free oscillation on the lower end of said suspension rod around an axis on either side of which their own weight is equally distributed, a bell-crank lever having one arm articulated at the rearward end portion of said feed rack, slideways for separately guiding without any sliding friction the rear ends of said nippers so that whenever the suspension rod is oscillated about said fixed point the nose ends of said nippers are caused to follow predetermined reciprocating paths including a common terminal portion to cause cyclic closing and opening of said nose ends of said nippers, as well as a predetermined cyclic relative motion between the nose ends of the nippers when closed and said combing cylinder, a slideway parallel to the lower nipper guiding slideway, means for guiding the other arm of said bell crank lever in said slideway parallel to the lower nipper guiding slideway, and means to create relative translational displacement between said parallel slideways to cause feed and withdrawal reciprocation of said feed rack with respect to said lower nipper.

2. A control device according to claim 1, wherein said last named means includes a reciprocating slide member, said guiding parallel slideway being mounted on said reciprocating slide member with said lower nipper guiding slideway being normally stationary.

3. A control device according to claim 2, wherein said last named means further comprises means to adjust the stroke length of said slide member without varying the upper limit of said stroke length which upper limit corresponds to the end of the feeding stroke of the feed rack with said adjusting means being adapted to stop the slide member motion while the means to create relative translational displacement further work.

4. A control device according to claim 3, wherein the said adjusting means includes a first lever, a connecting rod linked to said first lever at a point adjustable along an arc of a circle passing through the pivot of said lever, a second lever, link means between the second lever and the slide member and means articulating said rod to said second lever with said articulating point coinciding with the center of said arc when the slide member is in its terminal position corresponding to the end of the feeding stroke of the feed rack.

References Cited by the Examiner

UNITED STATES PATENTS 1,668,498  5/28  Gegauff _____ 19—225

DONALD W. PARKER, *Primary Examiner.*